United States Patent [19]
Washo et al.

[11] Patent Number: 5,196,978
[45] Date of Patent: Mar. 23, 1993

[54] CARTRIDGE CASE

[75] Inventors: Junichi Washo; Kenji Ohta; Shigeo Terashima; Masahiro Horii, all of Nara; Takao Hyuga, Kyoto; Toshihisa Deguchi, Nara, all of Japan

[73] Assignee: Sharp Kabushiki Kaisha, Osaka, Japan

[21] Appl. No.: 48,768

[22] Filed: May 12, 1987

[30] Foreign Application Priority Data

May 27, 1986 [JP] Japan .................................. 61-79798
May 27, 1986 [JP] Japan .................................. 61-79799

[51] Int. Cl.⁵ ............................................. G11B 23/03
[52] U.S. Cl. ..................................... 360/133; 206/444
[58] Field of Search ....... 360/133, 97.01, 99.01–99.03, 360/99.06, 86; 369/291; 206/312, 444

[56] References Cited

U.S. PATENT DOCUMENTS

| | | | |
|---|---|---|---|
| 4,482,929 | 11/1984 | Beck et al. | 360/133 |
| 4,589,105 | 5/1986 | Nemoto et al. | 360/133 |
| 4,698,714 | 10/1987 | Sugawara et al. | 360/133 |
| 4,714,973 | 12/1987 | Kato et al. | 360/133 |

FOREIGN PATENT DOCUMENTS 0218231 4/1987 Japan .................................. 360/133

*Primary Examiner*—Stuart N. Hecker
*Assistant Examiner*—David J. Severin
*Attorney, Agent, or Firm*—Flehr, Hohbach, Test, Albritton & Herbert

[57] ABSTRACT

A cartridge case for containing a disk-shaped recording medium has a shutter attached slidably thereon. The shutter is U-shaped sectionally and the edge sections where the shutter contacts the surface of the cartridge case are rounded so that friction therebetween is reduced when the shutter slides on the surface of the cartridge case. The cartridge case is provided with a notch and an indentation on at least one of its side surfaces corresponding to protruding pieces in the device into which the cartridge case is inserted such that a sensor in the device can be activated only when a cartridge case compatible with the device is inserted and these protruding pieces properly engage with the notch and the indentation on the cartridge case.

12 Claims, 2 Drawing Sheets

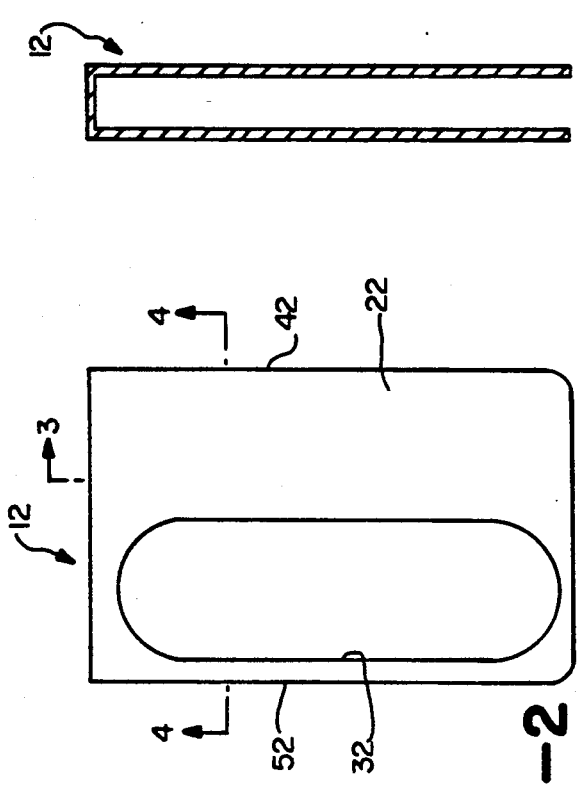
FIG.-3
FIG.-2
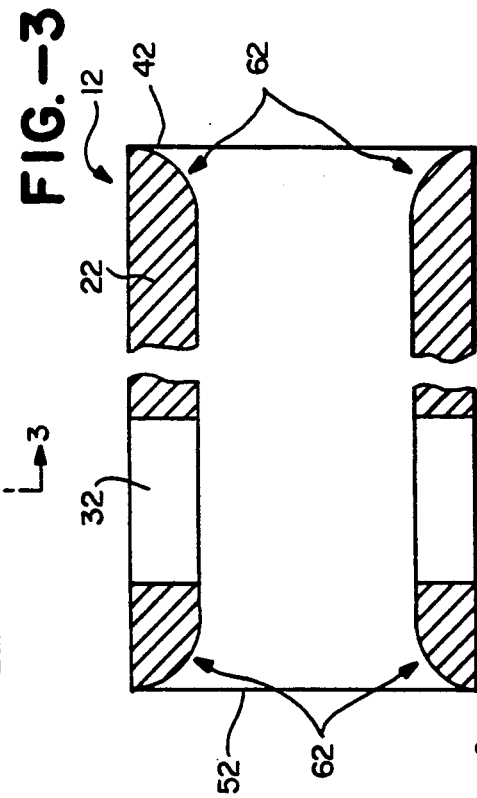
FIG.-4
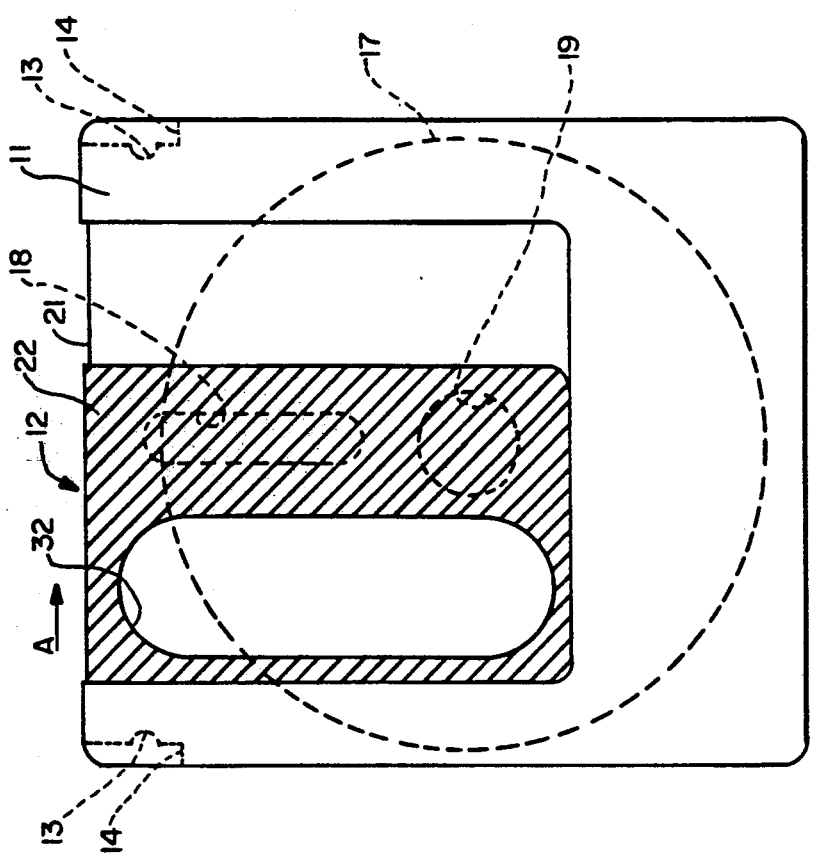
FIG.-1

CARTRIDGE CASE

BACKGROUND OF THE INVENTION

This invention relates to an improved cartridge case for containing a disk-shaped data recording medium for recording and reproducing data such as documentary files and images and to be inserted into a recording/reproduction device. In another aspect, the present invention also relates to a structure on such a cartridge case by means of which a recording/reproduction device can distinguish a compatible cartridge from a non-compatible case.

In general, a cartridge case for containing a disk-shaped data recording medium (hereinafter referred to simply as a disk) is provided with a window such that a part of the disk contained therein is exposed so that an axis of rotation and a read/write head of a recording/reproduction device can touch specified areas of the disk surface. Such a window is usually provided with a shutter which is slidably attached to the cartridge case and can be opened and closed. Since a shutter for this purpose must be light and strong, use is usually made of a thin metallic plate while a plastic material is usually used for the cartridge case because molding can be effected easily. When a shutter and a cartridge case with different hardness are used in combination together, however, edge sections of the shutter come into contact with and scrape the softer surface of the cartridge case as the shutter is opened and closed. The plastic pieces thus scraped off from the surface of the cartridge case may fly through the aforementioned window and become attached to the surface of the disk. Not only will such pieces affect the recording and reproduction signals when the disk is used for recording and reproduction but they may also enter between the axis of rotation and the bearing on the recording/reproduction device to prevent the normal rotary motion of the disk. It is therefore one of the objects of the present invention to provide a cartridge case with which friction can be reduced when the shutter is opened and closed so as to prevent the generation of small plastic pieces, thereby improving the recording and reproduction characteristics of the disk contained therein.

In another aspect, the present invention is addressed to the problem of compatibility between a disk and a recording/reproduction device. Since cartridge cases containing disks have different shapes and there are many types of driving mechanisms for disks, it is not always a simple matter to examine compatibility between a disk and a device which accepts it. If a non-compatible cartridge case is erroneously inserted into a device, the cartridge case itself or the internal structure of the recording/reproduction device may be damaged. In the past, however, this problem has not been considered seriously. It is therefore another object of the present invention to provide a cartridge case having a structure by which compatibility with a device which accepts it can be easily and reliably ascertained such that damage to the cartridge case and/or the internal structure of the device can be prevented.

SUMMARY OF THE INVENTION

The above and other objects of the present invention are achieved on the one hand by providing a cartridge case characterized as having appropriately curved inner edge sections on the shutter where the surface of the cartridge case slides against the shutter. With the contacting surface thus curved, the friction with the cartridge case can be reduced as the shutter is opened and closed so as to reduce the generation of small plastic pieces scraped by such frictional force.

In another aspect of the present invention, the cartridge case is provided with a first engaging section and a second engaging section (such as indentations) at least on one of its side surfaces. Correspondingly, the part of the recording/reproduction device where this cartridge case is inserted is provided with a first engaging piece and a second engaging piece (such as protrusions) such that a compatible cartridge case and the accepting device match properly and, when this occurs, a sensor is made to transmit a signal, indicating that a cartridge case of a proper (compatible) type has been inserted. In other words, the distance between the two indented sections on the cartridge case serves to identify compatibility of a cartridge case with a given recording/reproduction device.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a plan view of a cartridge case embodying the invention,

FIG. 2 is a plan view of the shutter shown in FIG. 1,

FIG. 3 is a sectional view of the shutter taken along the line 3—3 of FIG. 2,

FIG. 4 is a sectional view of the shutter taken along the line 4—4 of FIG. 2,

Before the description of the present invention proceeds, it is to be noted that like parts are designated by like reference numerals throughout several views of the accompanying drawings.

DETAILED DESCRIPTION OF THE INVENTION

Figure 5:
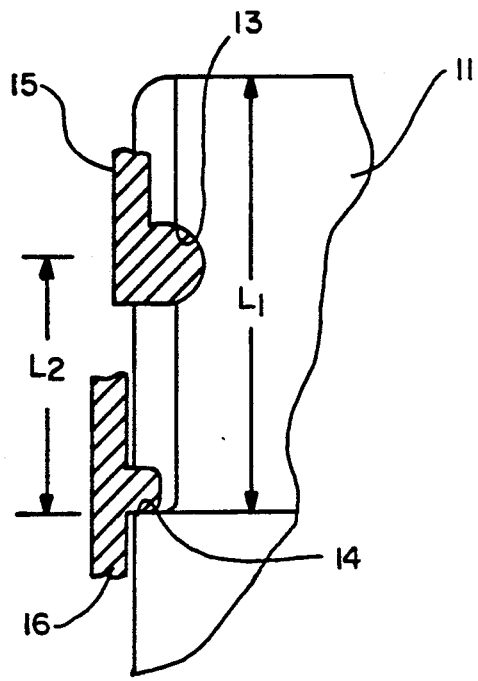
FIG. 5 is an enlarged plan view of an engaging section of a cartridge case of the present invention when inserted into a compatible device.

With reference to FIG. 1, there is shown a cartridge case 11 which contains a disk 17 and is adapted to be removably inserted into a cartridge accepting section of a recording/reproduction device (not shown). The cartridge case 11 is formed with an opening 18 through which a recording/reproduction area of the disk 17 contained therein is exposed so as to contact a read/write head (not shown) of the aforementioned recording/reproduction device, and a central hole 19 for a rotary access for rotating the disks 17. Additionally, the cartridge case 11 is provided with a shutter 12 with a substantially rectangular planar cover piece 22 having an opening 32 formed therein. The shutter 12 is slidable on the surface of the cartridge case 11 in the direction of its width as shown by the arrow A when the cartridge case 11 is inserted into the cartridge accepting section of a recording/reproduction device such that the opening 18 and the central axis 19 which have been covered by the cover piece 22 of the shutter 12 become exposed through the shutter opening 32.

FIG. 2 is a plan view of the shutter 12. The shutter 12, when seen in the direction of the line 3—3 of FIG. 2, is U-shaped with two wings which are substantially parallel to each other, one of the wings shown in FIG. 3 representing the aforementioned cover piece 22. For convenience, the inwardly facing surfaces of these wings are hereinafter referred to as inner surfaces of the shutter 12. When the cartridge case 11 is inserted into this U-shaped opening of the shutter through its forward edge 21, the two wings of the shutter 12 serve to sandwich the cartridge case 11 therebetween.

With reference to FIG. 4 which is a sectional view taken along the line 4—4 of FIG. 2, the shutter 12 of the present invention is characterized as having rounded edge sections 62 on the aforementioned inner surface along its side edges 42 and 52 perpendicular to the direction in which the shutter 12 slides against the cartridge case 11. With the edge sections 62 thus formed with a curve, the angles of contact between the surface of the cartridge case 11 and the shutter 12 become less sharp and the frictional force therebetween becomes substantially reduced. In other words, the shutter 12 can slide more smoothly on the cartridge case 11 and plastic pieces are not scraped off the surface. The rounded edge sections 62 may be formed either by polishing or by orienting the sharp edge sections in the outward direction when the shutter 12 is molded.

With reference again to FIG. 1, the cartridge case 11 is provided with grooved sections with notches 14 (first engaging means) on its side surfaces. Inside each of these grooved sections and nearly at the center along their lengths are indentations 13 (second engaging means). These grooved sections and indentations 13 are formed symmetrically such that at least those on one side of the cartridge case 11 will function as engaging means when the cartridge case 11 is turned upside down as will be described below and recording and/or reproduction can be effected on and/or from both surfaces of the disk 17.

Figure 6:
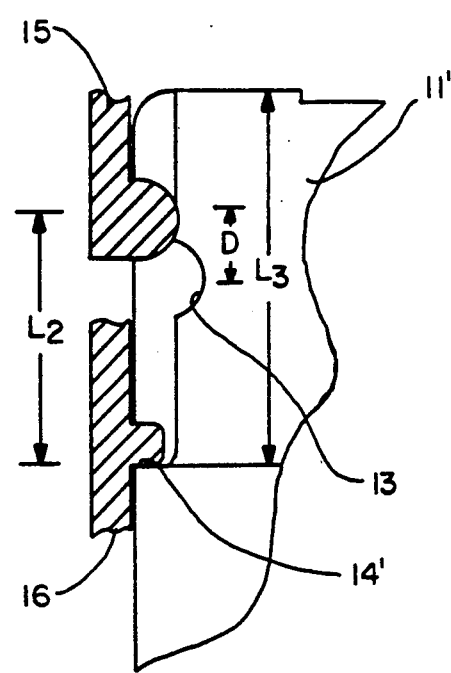
FIG. 6 is an enlarged plan view of a similar engaging section of a non-compatible cartridge case embodying the present invention when inserted into the device of FIG. 5

FIGS. 5 and 6 show a section of the disk accepting part of a recording/reproduction device, including a sensor piece 15 and a protrusion 16. FIG. 5 shows a situation when the cartridge case 11 is compatible with the accepting device, the cartridge case 11 having a grooved section of length $L_1$ with a notch 14 and an indentation 13 at a distance $L_2$ from the notch 14, and the sensor piece 15 and the protrusion 16 so positioned that they engage respectively with the indentation 13 and the notch 14 when the cartridge case 11 is inserted all the way into the accepting device. The sensor piece 15 is connected to a sensor (not shown) adapted to be activated when the sensor piece 15 becomes engaged with the indentation 13, thereupon transmitting a signal, indicating that a compatible cartridge case has been properly set in the accepting part of the device. This signal is transmitted to a control unit (not shown) of the recording/reproduction device and the control unit, upon receiving this signal, proceeds to the next operation such as loading of the disk 17.

In summary, if the compatible cartridge case 11 is inserted into the accepting part of a recording/reproduction device, the protrusion 16 in the device touches the notch 14 at the distance of $L_1$. Correspondingly thereto, the sensor piece 15 at a distance $L_2$ from the protrusion 16 engages with the indentation 13, activating the sensor connected to the sensor piece 15.

In FIG. 6, numeral 11' indicates a cartridge case structured similarly to that shown in FIG. 1 except it is not compatible with the recording/reproduction device of FIG. 5. For the purpose of the present invention, the groove on the side surface of this non-compatible cartridge case 11' is different in length such that its notch 14' is at a distance $L_3$ (which is different from $L_1$ by D) from the forward edge of the cartridge case 11'. If this non-compatible cartridge case 11' is inserted into the same recording/reproduction device shown in FIG. 5, therefore, the protrusion 16 engages with the notch 14' as shown in FIG. 6 before the sensor piece 15 comes to the position of the indentation 13. Thus, the cartridge case 11' cannot be pushed further from the engaged position shown in FIG. 6 and the sensor piece 15 cannot engage with the indentation 13. This means that the sensor cannot be activated and the control unit thereby concludes that a non-compatible cartridge case has been inserted and transmits a command to have it rejected from the device.

Figure 7:
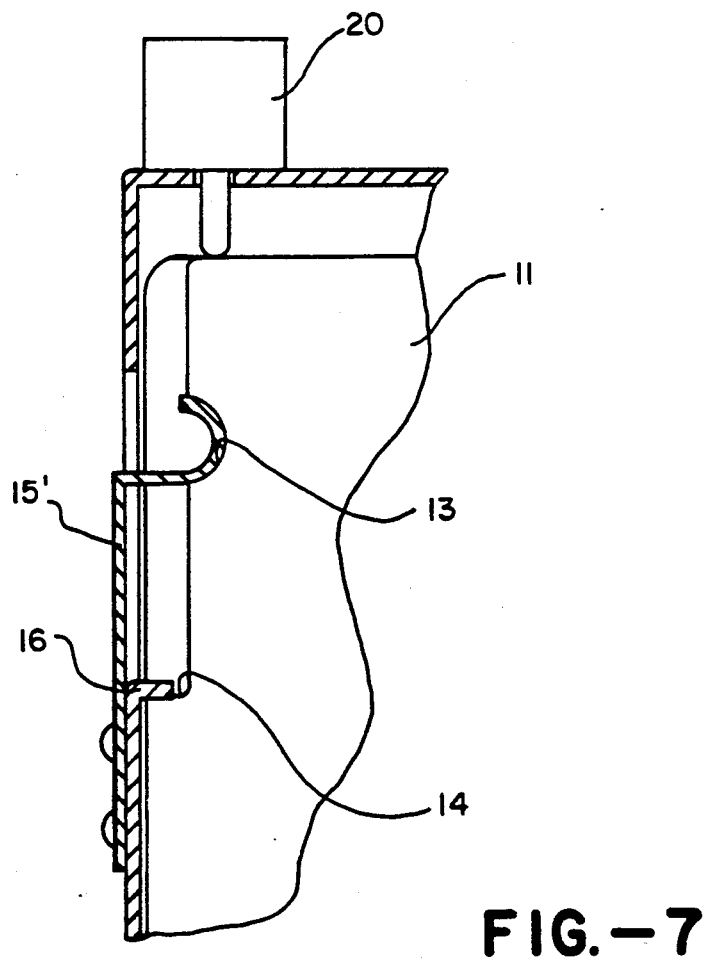
FIG. 7 is a plan view of an engaging section of a cartridge case according to another embodiment of the present invention.

FIG. 7 illustrates an alternative engaging mechanism between a cartridge case 11 and an accepting device. A cartridge case accepting device according to this embodiment of the present invention includes a protrusion 16 similar to those shown in FIGS. 5 and 6 and adapted to contact the notch 14 and another protruding piece 15' which is biased to compress the cartridge case 11 and adapted to become engaged with the indentation 13 when the protrusion 16 contacts the notch 14. In other words, the biased protruding piece 15' is at a distance $L_2$ from the protrusion 16. A sensor 20 is provided in such a way that it is activated only when the protrusion 16 and the biased protruding piece 15' become engaged respectively with the notch 14 and the indentation 13 on the cartridge case 11. When the sensor 20 is thus activated, its signal is transmitted from the sensor 20, indicating that the cartridge case 11 is compatible with the device and has been properly inserted. When this signal is received by the control unit (not shown) of the device, the device proceeds to the next operation such as loading of the disk 17 as described in connection with the previous embodiment of the present invention.

In summary, compatibility between a cartridge case and a device which accepts it can be determined easily according to the present invention and a non-compatible cartridge case can be removed automatically from a device even if an attempt is made erroneously to insert it such that damage to the cartridge case and/or the internal structure of the accepting device can be reliably prevented.

The foregoing description of preferred embodiments of the invention has been presented for purposes of illustration and description. It is not intended to be exhaustive or to limit the invention to the precise form disclosed, and many modifications and variations are possible in light of the above teaching. Such modifications and variations which may be apparent to a person skilled in the art are intended to be included within the scope of this invention.

What is claimed is:

1. In an cartridge case for containing a disk-shaped data recording medium, said cartridge case having planar outer surfaces and a front edge and being formed with an opening through which a portion of said data recording medium is exposed, said cartridge case including a shutter which is attached thereto slidably along said front edge and is adapted to thereby open and close said opening, the improvement wherein said shutter has two planar covering pieces which are parallel to each other and to said planar outer surfaces of said cartridge case and serve to sandwich said cartridge case therebetween, said planar covering pieces having inner surfaces which face each other, said planar covering pieces further having side edges which extend perpendicularly to said front edge, said inner surfaces of said planar covering pieces being rounded along said side edges so as to reduce friction between said shutter and said cartridge case.

2. The cartridge case of claim 1 wherein said shutter is sectionally U-shaped.

3. The cartridge case of claim 1 which is made of a plastic material, said shutter being made of a thin metallic material.

4. The cartridge case of claim 1 further comprising a first engaging section on at least one side edge thereof, said first engaging section being adapted to engage with a first engaging piece in a device into which said cartridge case is adapted to be inserted, and a second engaging section on said side edge of said cartridge case, said second engaging section being adapted to engage with a second engaging piece in said device when said first engaging section and said first engaging piece engage with each other only if said cartridge case is compatible with said device.

5. The cartridge case of claim 4 wherein said first engaging section comprises a notch and said second engaging section comprises an indentation formed on said side edge of said cartridge case.

6. In a recording/reproduction device having a cartridge case accepting section, the improvement wherein said cartridge case accepting section comprises a first engaging piece adapted to engage with a first engaging section of a cartridge case which is inserted into said cartridge case accepting section, a second engaging piece adapted to engage with a second engaging section of said cartridge case when said first engaging piece engages with said first engaging section of said cartridge case only if said cartridge case is compatible with said device, and sensor means for transmitting a signal when said second engaging piece engages with said second engaging section of said cartridge case.

7. The recording/reproduction device of claim 6 wherein said first engaging section is a notch on a side edge of said cartridge case and said first engaging piece is a member protruding towards said side edge when said cartridge case is inserted into said cartridge case accepting section.

8. The recording/reproduction device of claim 6 wherein said second engaging section comprises an indentation on a side edge of said cartridge case and said second engaging piece is a piece protruding towards and biased against said side edge of said cartridge case when said cartridge case is inserted into said cartridge case accepting section.

9. The recording/reproduction device of claim 6 wherein said second engaging piece is directly connected to said sensor.

10. The recording/reproduction device of claim 6 wherein said second engaging piece is disposed separately from said sensor means.

11. In a cartridge case adapted to be inserted into a cartridge case accepting section of a recording/reproduction device, the improvement wherein said cartridge case has a first engaging section on at least one side edge thereof, said first engaging section being adapted to engage with a first engaging piece in said cartridge case accepting section and a second engaging section on said side edge, said second engaging section being adapted to engage with a second engaging piece in said cartridge case accepting section when said first engaging section and said first engaging piece engage with each other only if said cartridge case is compatible with said device.

12. The cartridge case of claim 11 wherein said first engaging section comprises a notch and said second engaging section comprises an indentation formed on said side edge.

* * * * *